US012605576B1

(12) United States Patent
Power, II et al.

(10) Patent No.: US 12,605,576 B1
(45) Date of Patent: Apr. 21, 2026

(54) HUNTING SAFETY HARNESS

(71) Applicant: Tethrd LLC, Columbia, TN (US)

(72) Inventors: Walter Ernest Power, II, Columbia, TN (US); Gregory Alan Godfrey, Richmond Hill, GA (US); Carl Eugene Kossuth, III, Rolla, MO (US); Shawn Paul Chadwick, Merrill, WI (US)

( * ) Notice: Subject to any disclaimer, the term of this patent is extended or adjusted under 35 U.S.C. 154(b) by 0 days.

(21) Appl. No.: 19/060,290

(22) Filed: Feb. 21, 2025

Related U.S. Application Data

(63) Continuation of application No. 19/028,060, filed on Jan. 17, 2025, now abandoned.

(51) Int. Cl.
| | |
|---|---|
| *A62B 35/00* | (2006.01) |
| *A01M 31/02* | (2006.01) |

(52) U.S. Cl.
CPC ......... *A62B 35/0012* (2013.01); *A01M 31/02* (2013.01); *A62B 35/0037* (2013.01)

(58) Field of Classification Search
CPC .... A62B 35/0012; A62B 18/25; A01M 31/02; F16G 11/02; A41F 1/00; Y10T 24/37
See application file for complete search history.

(56) References Cited

U.S. PATENT DOCUMENTS

| | | | | | |
|---|---|---|---|---|---|
| 4,168,022 | A | * | 9/1979 | Brewer | A45F 5/00 396/428 |
| 4,434,920 | A | * | 3/1984 | Moore | A47D 13/025 224/160 |
| 4,993,128 | A | * | 2/1991 | Gold | F16G 11/02 24/712 |
| 5,010,850 | A | * | 4/1991 | Sailer | A47D 13/086 182/7 |
| 5,725,139 | A | * | 3/1998 | Smith | A45F 3/02 224/637 |
| 6,128,782 | A | * | 10/2000 | Young | A62B 35/0018 244/151 R |
| 6,749,099 | B2 | * | 6/2004 | Danielson | A45F 5/021 226/149 |
| 8,025,192 | B2 | * | 9/2011 | Petzl | A62B 35/0025 224/660 |

(Continued)

FOREIGN PATENT DOCUMENTS

| | | | | | |
|---|---|---|---|---|---|
| EP | 0775845 | A2 | * | 5/1997 | |
| EP | 1712259 | B1 | * | 8/2016 | ......... A62B 35/0025 |
| WO | WO-2023245250 | A1 | * | 12/2023 | ............... A45F 3/14 |

*Primary Examiner* — Ryan D Kwiecinski
*Assistant Examiner* — Kathleen M. McFarland

(57) ABSTRACT

A hunting safety harness includes a saddle and a cord. The saddle includes a first saddle portion, a second saddle portion, and an expansion portion therebetween that is expandable to increase and decrease the size of the saddle. The cord is coupled to the first saddle portion and the second saddle portion and extends over the expansion portion. The cord is designed to resiliently stretch when the expansion portion is expanded and to contract to collapse the expansion portion. The cord is folded into a pair of cord portions extending side by side over the expansion portion, each having a free end. A friction assembly is attached to the second saddle portion. Each of the free ends is inserted through and held by the friction assembly. Each of the free ends is adjustable in the friction assembly to adjust a tension on a respective one of the cord portions.

15 Claims, 5 Drawing Sheets

(56)                  References Cited

U.S. PATENT DOCUMENTS

| | | | | |
|---|---|---|---|---|
| 8,459,518 B2 * | 6/2013 | Demsky | .............. | A62B 35/0012 |
| | | | | 224/628 |
| 8,678,134 B2 * | 3/2014 | Wood | ...................... | A62B 1/14 |
| | | | | 182/5 |
| 9,492,004 B1 * | 11/2016 | Young | ....................... | A45F 5/00 |
| 10,750,879 B2 * | 8/2020 | Schachtner | .......... | A47D 13/025 |
| 11,123,585 B2 * | 9/2021 | Howland | .............. | A41D 13/008 |
| 11,179,584 B2 * | 11/2021 | Power, II | .............. | A01M 31/02 |
| 11,351,405 B2 * | 6/2022 | Power, II | .............. | A01M 31/02 |
| 11,771,931 B2 * | 10/2023 | Leach | ................ | A62B 35/0025 |
| | | | | 182/3 |
| 12,011,623 B1 * | 6/2024 | Power, II | ........... | A62B 35/0012 |
| 2009/0057360 A1 * | 3/2009 | Demsky | .............. | A62B 35/0012 |
| | | | | 224/262 |
| 2012/0222912 A1 * | 9/2012 | Wood | ................. | A62B 35/0031 |
| | | | | 182/6 |
| 2020/0114181 A1 * | 4/2020 | Monahan | ........... | A62B 35/0018 |
| 2020/0206548 A1 * | 7/2020 | Howland | ........... | A62B 35/0018 |
| 2020/0324153 A1 * | 10/2020 | Power, II | .............. | A47C 3/0255 |
| 2020/0398088 A1 * | 12/2020 | Power, II | ........... | A62B 35/0025 |
| 2021/0101032 A1 * | 4/2021 | Power, II | ........... | A62B 35/0012 |
| 2021/0178200 A1 * | 6/2021 | Power, II | ............... | A63B 27/00 |
| 2021/0178201 A1 * | 6/2021 | Power, II | .............. | A01M 31/02 |
| 2021/0228923 A1 * | 7/2021 | Power, II | ........... | A62B 35/0037 |
| 2021/0275843 A1 * | 9/2021 | Lucas | ................ | A62B 35/0037 |
| 2022/0249886 A1 * | 8/2022 | Leach | ................ | A62B 35/0031 |
| 2022/0266072 A1 * | 8/2022 | Power, II | .............. | A01M 31/02 |
| 2023/0173312 A1 * | 6/2023 | Gregoire, Jr. | ...... | A62B 35/0012 |
| | | | | 182/9 |
| 2023/0248135 A1 * | 8/2023 | Farmer, II | .............. | A01M 31/02 |
| | | | | 224/191 |
| 2025/0031686 A1 * | 1/2025 | Lee | .................... | A62B 35/0012 |

* cited by examiner

HUNTING SAFETY HARNESS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to hunting saddle devices and more particularly pertains to a new hunting safety harness. Such saddle devices are worn by a user and secured by a tree line to a tree to prevent a user from falling from a tree while hunting. The new hunting safety harness includes an expandable portion to permit a user to adjust the size of the saddle for comfort and stability. A cord, such as a shock cord, is connected to the saddle on either side of the expandable portion, which cord is designed to stretch when the expansion portion is expanded and to contract to collapse the expansion portion when the saddle is not in use. A friction assembly is frictionally engaged with the cord to allow a user to selectively adjust the tension on the cord.

(2) Description of Related Art Including Information Disclosed Under 37 CFR 1.97 and 1.98

The prior art relates to hunting saddle assemblies, and, as best understood, does not disclose a hunting safety harness that includes a saddle and a cord, wherein the saddle has an expandable portion, and wherein the cord is connected to the saddle on either side of the expandable portion, which cord is designed to stretch when the expansion portion is expanded and to contract to collapse the expansion portion when the saddle is not in use.

BRIEF SUMMARY OF THE INVENTION

An embodiment of the disclosure meets the needs presented above in a hunting safety harness designed to be worn by a user and engaged with a bridge line generally comprising a saddle and a cord. The saddle is designed to support a posterior portion of a body of the user. The saddle includes a first saddle portion, a second saddle portion, and an expansion portion. The expansion portion is positioned between the first saddle portion and the second saddle portion. The expansion portion is expandable to increase a size of the saddle when in use and collapsible to decrease the size of the saddle when not in use. The cord is coupled to the first saddle portion and the second saddle portion. The cord extending over the expansion portion. The cord includes resilient material. The cord is designed to stretch when the expansion portion is expanded and to contract to collapse the expansion portion when the saddle is not in use. The cord is folded into a pair of cord portions extending side by side over the expansion portion. The cord includes a pair of free ends. Each of the free ends is positioned on a respective one of the cord portions. A friction assembly is attached to the second saddle portion. Each of the free ends is inserted through and held by the friction assembly. Each of the free ends is adjustable in the friction assembly to adjust a tension on a respective one of the cord portions.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
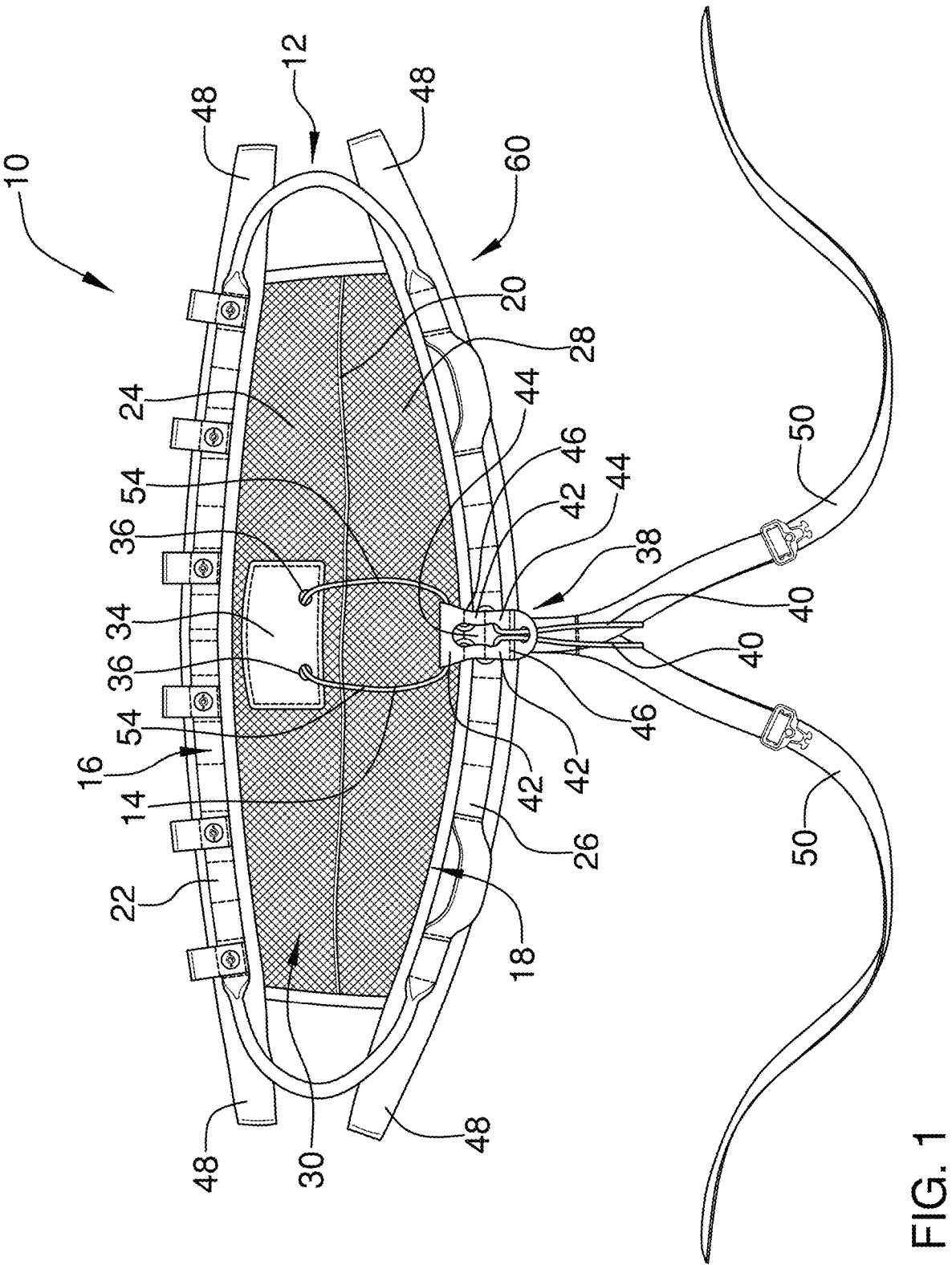
FIG. 1 is a front view of a hunting safety harness according to an embodiment of the disclosure.

With reference now to the drawings, and in particular to FIGS. 1 through 5 thereof, a new hunting safety harness embodying the principles and concepts of an embodiment of the disclosure and generally designated by the reference numeral 10 will be described.

Figure 2:
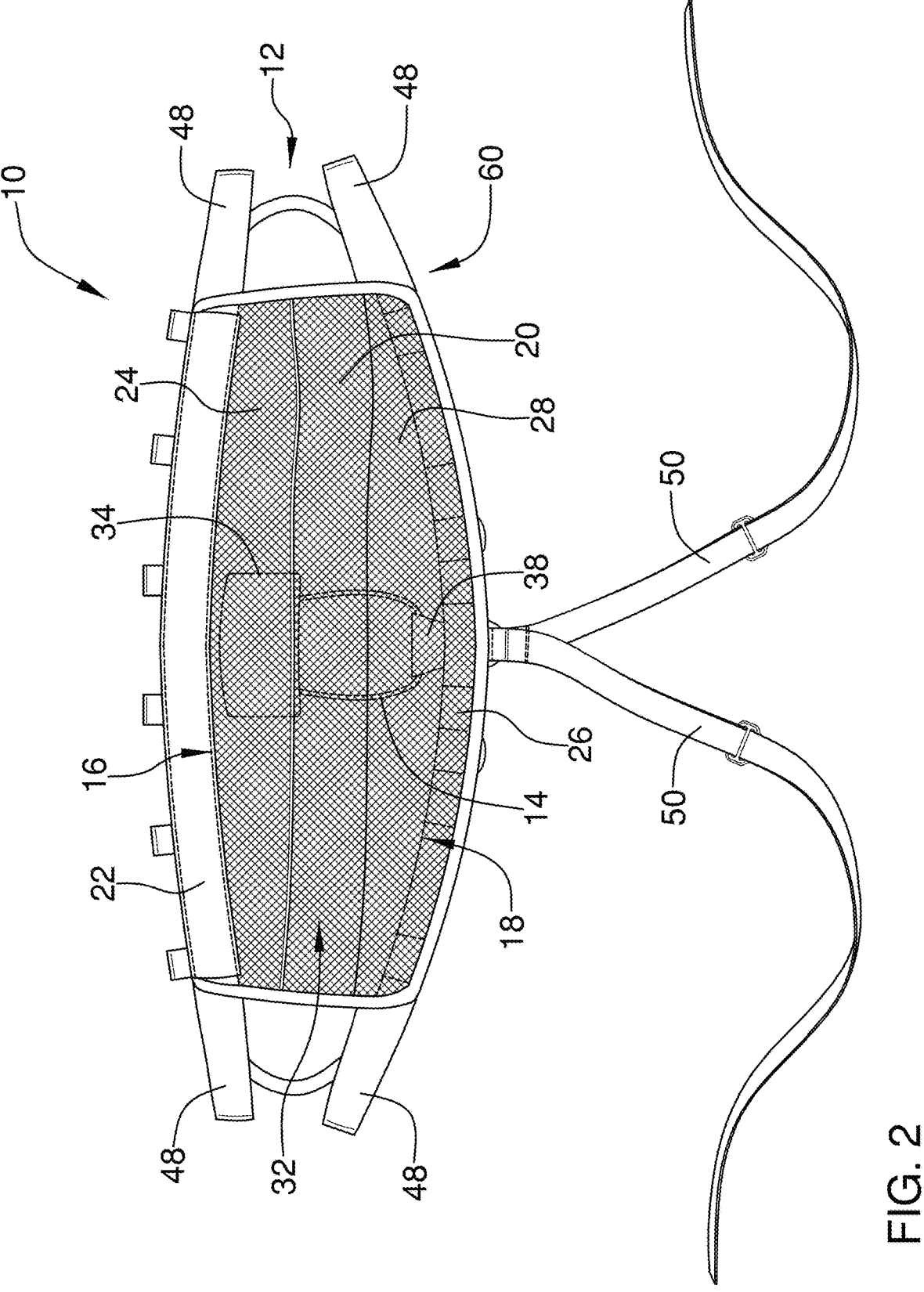
FIG. 2 is a rear view of an embodiment of the disclosure.
Figure 3:
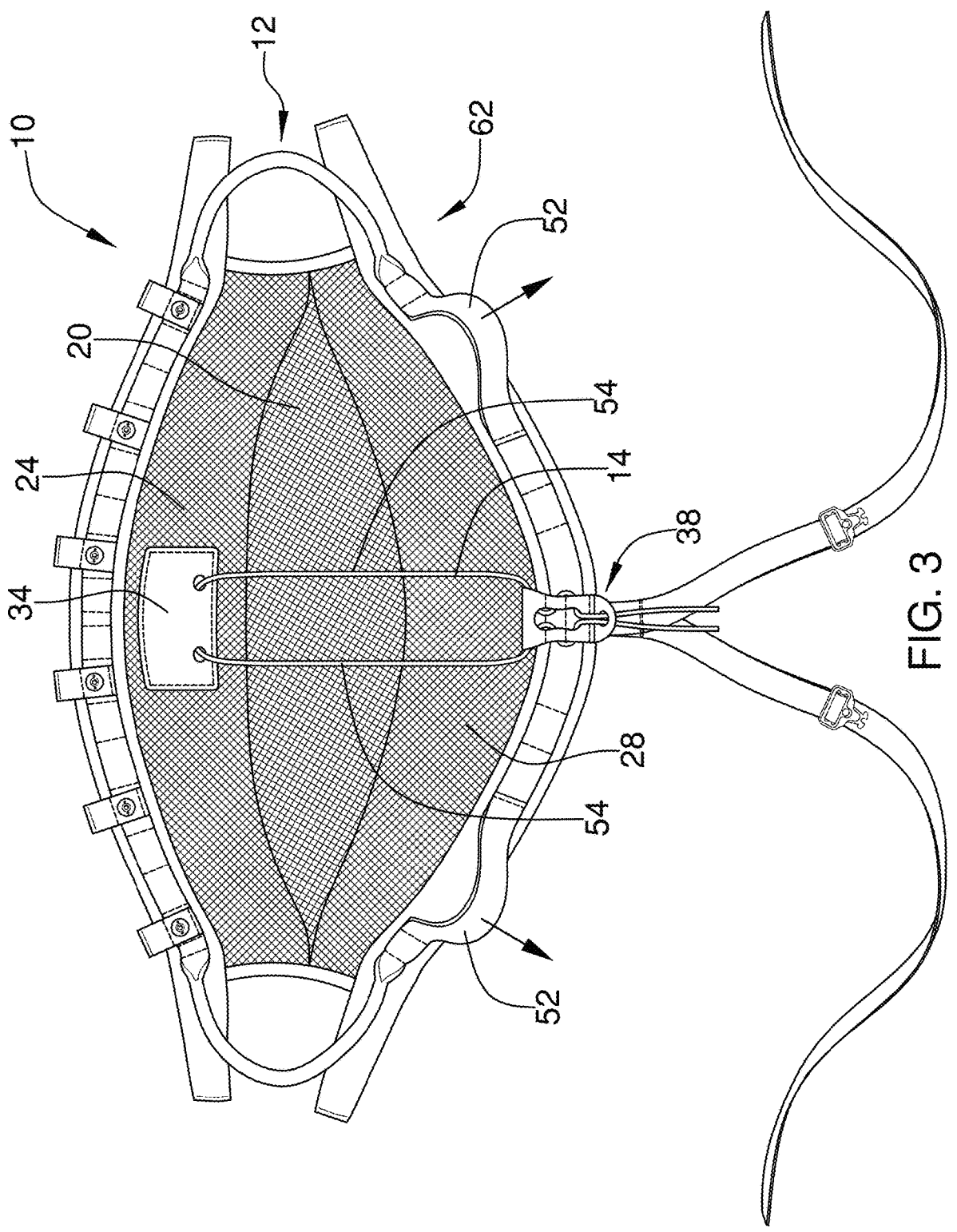
FIG. 3 is a front view of an embodiment of the disclosure in an expanded state.
Figure 4:
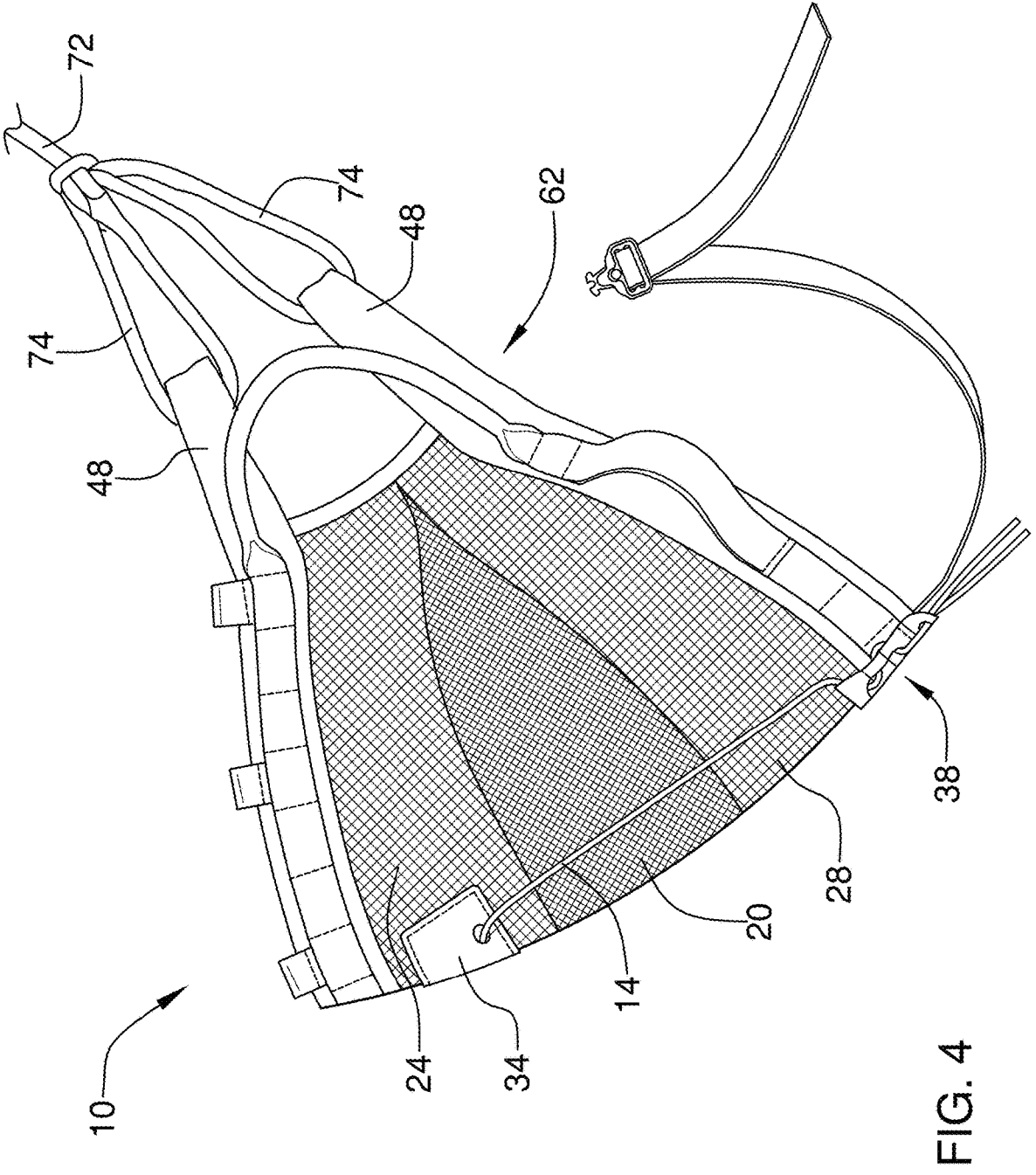
FIG. 4 is a side view of an embodiment of the disclosure in use in the expanded state.
Figure 5:
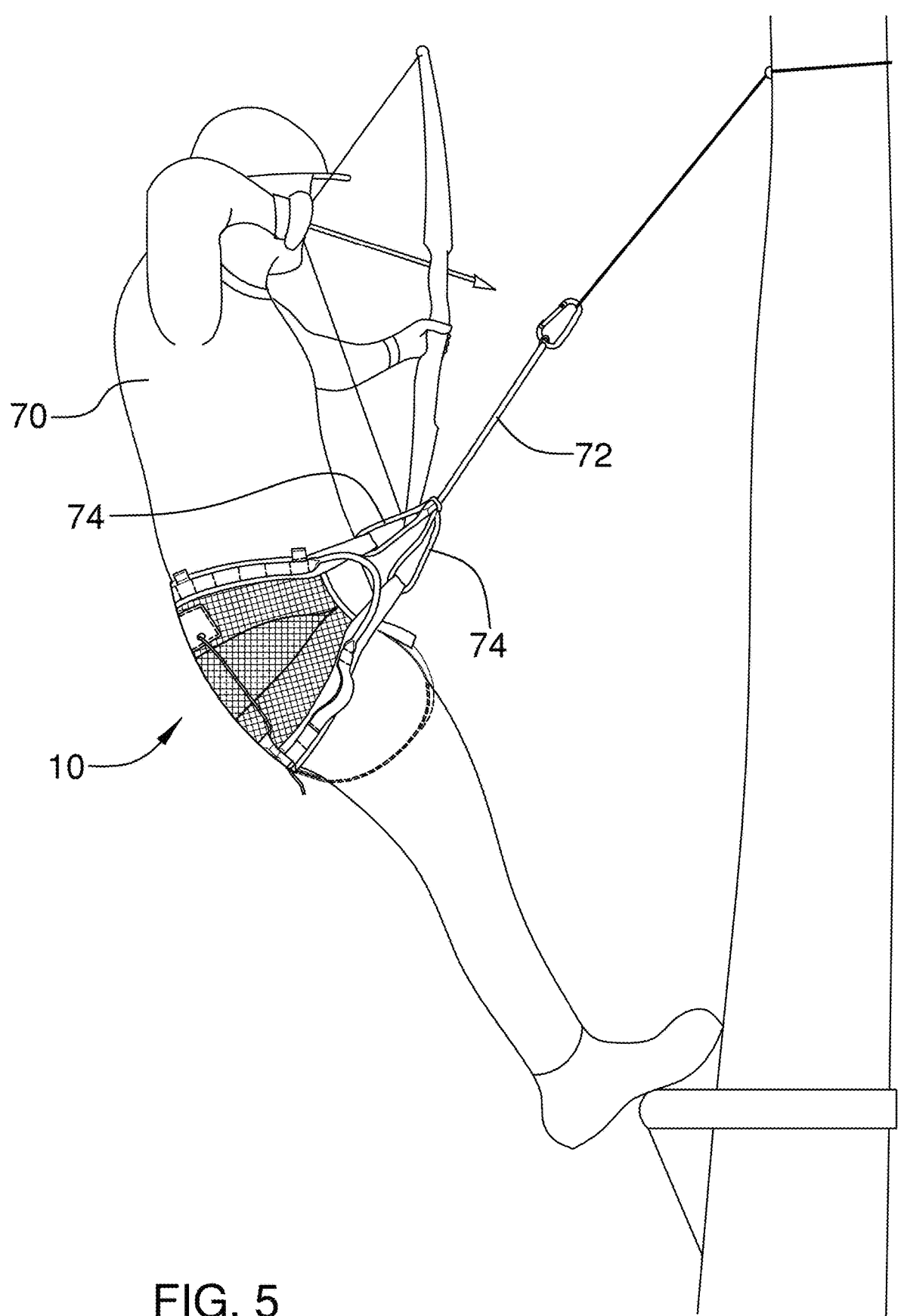
FIG. 5 is a side view of an embodiment of the disclosure in use in the expanded state.

As best illustrated in FIGS. 1 through 5, the hunting safety harness 10 is designed to be worn by a user 70, such as a hunter, and engaged with a bridge line 72. As shown in FIG. 1, the hunting safety harness 10 generally includes a saddle 12 and a cord 14. The saddle 12 is designed to support a posterior portion of a body of the user 70. For example, as shown in FIG. 5, the saddle 12 is positioned to support a buttocks region or a lower back region of a hunter. The saddle 12 includes a first saddle portion 16, a second saddle portion 18, and an expansion portion 20. The expansion portion 20 is positioned between the first saddle portion 16 and the second saddle portion 18. The expansion portion 20 is expandable to increase a size of the saddle 12 when in use and collapsible to decrease the size of the saddle 12 when not in use. For example, the expansion portion 20 is in a collapsed state 60 in FIGS. 1 and 2, such that the first saddle portion 16 and the second saddle portion 18 are close together. The expansion portion 20 can be expanded from the collapsed state 60 into an expanded state 62, as shown in FIGS. 1 and 3. The cord 14 is coupled to the first saddle portion 16 and the second saddle portion 18. The cord 14 extends over the expansion portion 20. The cord 14 includes resilient material, such that the cord 14 is designed to stretch when the expansion portion 20 is expanded, as shown in FIG. 3, and to contract to collapse the expansion portion 20 when the saddle 12 is not in use, such as is shown in FIG. 1. The cord 14 is folded into a pair of cord portions 54 extending side by side over the expansion portion 20. The cord 14 includes a pair of free ends 40. Each of the free ends 40 is positioned on a respective one of the cord portions 54. In the exemplary embodiment in FIG. 1, a friction assembly 38 is attached to the second saddle portion 18. It should be noted that the positioning of the friction assembly 38 on the second saddle portion 18 is only one exemplary embodiment, as the friction assembly 38 could be positioned on the first saddle portion 16 in another possible embodiment. Each of the free ends 40 is inserted through and held by the friction assembly 38. Each of the free ends 40 is adjustable in the friction assembly 38 to adjust a tension on a respective one of the cord portions 54.

The friction assembly 38 holds the free ends 40 by friction force. In that respect, in the exemplary embodiment, the friction assembly 38 includes a plurality of passages 42. Each of the free ends 40 of the cord 14 is removably woven through the passages 42, such as, for example, in a serpentine or zig zag manner, to promote frictional engagement between the friction assembly 38 and the cord 14. In the exemplary embodiment, the free ends 40 are woven through the passages 42 to prevent inadvertent disconnection of the free ends 40 from the friction assembly 38. In the exemplary embodiment shown in FIG. 1, the friction assembly 38 includes two layers 44 of material stacked on one another. A plurality of stitches 46 form the passages 42 between the two layers 44 of material. However, the friction assembly 38 as shown in the drawings is only one exemplary embodiment. In that regard, the cord 14 could be coupled to the second saddle portion 18 in a different manner than the friction assembly 38, such as being stitched or woven into the second saddle portion 18, or connected by clasps, hooks, snaps, or buttons, or attached by an adhesive or bond.

FIG. 1 shows an exemplary embodiment as to how the cord 14 could be coupled to the saddle 12. In this exemplary embodiment, a patch 34 is attached to the first saddle portion 16. The patch 34 includes a pair of apertures 36. The cord 14 is inserted through the apertures 36 and between the patch 34 and the first saddle portion 16 to couple the cord 14 to the patch 34. However, the cord 14 could be coupled to the first saddle portion 16 in a different manner, such as being stitched or woven into the first saddle portion 16, or connected by clasps, hooks, snaps, or buttons, or attached by an adhesive or bond. In another possible embodiment, the patch 34 could be coupled to the second saddle portion 18.

In the exemplary embodiment shown in FIG. 1, the first saddle portion 16 includes a first strap 22 and a first panel 24 attached to the first strap 22. The second saddle portion 18 includes a second strap 26 and a second panel 28 attached to the second strap 26. As shown in FIG. 3, the expansion portion 20 is attached to and connects the first panel 24 and the second panel 28. In the exemplary embodiment in FIG. 1, the cord 14 is coupled to the first panel 24 and the second strap 26. In this specific embodiment, the patch 34 is attached to the first panel 24 and the friction assembly 38 is attached to the second strap 26. However, in another possible embodiment, the cord 14, and likewise the patch 34 and the friction assembly 38, could be coupled anywhere on the first saddle portion 16 and the second saddle portion 18, such as the first strap 22 and the second panel 28, the first strap 22 and the second strap 26, and the first panel 24 and the second panel 28.

The saddle 12 includes a first side 30 and a second side 32. The second side 32, shown in FIG. 2, is abuttable against the body of the user 70, as shown in FIG. 5. The cord 14 is positioned on the first side 30, as shown in FIG. 1. The cord 14 could possibly be positioned on the second side 32, or positioned at least partially within the saddle 12.

In the exemplary embodiment in FIG. 3, each of the first panel 24, the second panel 28, and the expansion portion 20 includes a flexible mesh integrally formed together. In one possible embodiment, the flexible mesh can be resiliently stretchable. The cord 14 is a shock cord, which generally includes an elastic core and a woven sheath about the elastic core. However, in another possible embodiment, the cord 14 could be made solely from an elastic or rubber material. The patch 34 could be made of natural or synthetic materials, such as leather, plastic, fabric, or metal. The friction assembly 38 could also be made of natural or synthetic materials, such as leather, plastic, fabric, or metal.

With reference to FIGS. 4 and 5, the saddle 12 can be connected to the bridge line 72, which is in turn connectable to a tree. Bridge loops 48 are attached to the ends of the first strap 22 and the second strap 26. The bridge line 72 can include looped portions 74 that can be interlocked with the bridge loops 48. Leg straps 50 are connected to the saddle 12, which leg straps 50 can be wrapped around the legs of the user 70 for stability and connected to a central connector (not shown) as is well known in saddle hunting. As shown in FIG. 5, the expansion portion 20 has been expanded, such as by pulling on the handles 52 as shown in FIG. 3, such that the saddle 12 has a size suitable to support the buttocks region and second back region of the user 70, in this case a hunter. The cord 14 is stretched between the patch 34 and the friction assembly 38. When the user 70 is done using the saddle 12, the cord 14 will contract and collapse the expansion portion 20, thereby decreasing the size of the saddle 12 for easier transport and storage.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A hunting safety harness configured to be worn by a user and engaged with a bridge line, the hunting safety harness comprising:

a saddle being configured to support a posterior portion of a body of the user, said saddle including a first saddle portion, a second saddle portion, and an expansion portion, said expansion portion being positioned between said first saddle portion and said second saddle portion, said expansion portion being expandable to increase a size of said saddle when in use and collapsible to decrease the size of said saddle when not in use, said first saddle portion including a first strap and a first panel attached to said first strap, a second saddle portion including a second strap and a second panel attached to said second strap, said expansion portion being attached to and connecting together said first and second panels;

a cord being coupled to said first saddle portion and said second saddle portion such that said cord extends along a surface of said saddle, said cord being coupled to said first panel and being spaced from said first strap, said cord comprising resilient material, said cord being configured to stretch when said expansion portion is expanded and to contract to collapse said expansion portion when said saddle is not in use, said cord being folded into a pair of cord portions extending side by side over said expansion portion, said cord including a pair of free ends, each of said free ends being positioned on a respective one of said cord portions; and a friction assembly being attached to said second saddle portion, each of said free ends being inserted through and held by said friction assembly, each of said free ends being adjustable in said friction assembly to adjust a tension on a respective one of said cord portions.

2. The hunting safety harness of claim 1, further including a patch being attached to said first saddle portion, said patch including a pair of apertures, said cord being inserted through said apertures and between said patch and said first saddle portion to couple said cord to said patch.

3. The hunting safety harness of claim 2, wherein:
said first saddle portion includes a first strap and a first panel attached to said first strap;
said second saddle portion includes a second strap and a second panel attached to said second strap;
said expansion portion is attached to and connects said first panel and said second panel; and
said cord is coupled to said first panel and said second strap.

4. The hunting safety harness of claim 3, wherein said patch is attached to said first panel and said friction assembly is attached to said second strap.

5. The hunting safety harness of claim 4, wherein:
said saddle includes a first side and a second side:
said second side is abuttable against the body of the user; and
said cord is positioned on said first side.

6. The hunting safety harness of claim 5, wherein:
said friction assembly includes a plurality of passages; and
each of said free ends of said cord is removably woven through said passages to promote frictional engagement between said friction assembly and said cord.

7. The hunting safety harness of claim 6, wherein said friction assembly includes:
two layers of material stacked on one another; and
a plurality of stitches to form said passages between said two layers of material.

8. The hunting safety harness of claim 7, wherein each of said first panel, said second panel, and said expansion portion comprises a flexible mesh integrally formed together.

9. The hunting safety harness of claim 8, wherein said cord is a shock cord.

10. The hunting safety harness of claim 1, wherein:
said saddle includes a first side and a second side:
said second side is abuttable against the body of the user; and
said cord is positioned on said first side.

11. The hunting safety harness of claim 1, wherein:
said friction assembly includes a plurality of passages; and
each of said free ends of said cord is removably woven through said passages to promote frictional engagement between said friction assembly and said cord.

12. The hunting safety harness of claim 11, wherein said friction assembly includes:
two layers of material stacked on one another; and
a plurality of stitches to form said passages between said two layers of material.

13. The hunting safety harness of claim 1, wherein:
said first saddle portion includes a first strap and a first panel attached to said first strap;
said second saddle portion includes a second strap and a second panel attached to said second strap;
said expansion portion is attached to and connects said first panel and said second panel; and
said cord is coupled to said first panel and said second strap.

14. The hunting safety harness of claim 13, wherein each of said first panel, said second panel, and said expansion portion comprises a flexible mesh integrally formed together.

15. The hunting safety harness of claim 1, wherein said cord is a shock cord.

* * * * *